United States Patent [19]
Lang et al.

[11] 3,820,552
[45] June 28, 1974

[54] FILTER CARTRIDGE CLEANER

[75] Inventors: Robert S. Lang; Robert L. Carnot, both of Tampa, Fla.

[73] Assignee: L. F. Lang & Son Pools, Inc., Tampa, Fla.

[22] Filed: Feb. 22, 1973

[21] Appl. No.: 318,052

[52] U.S. Cl............. 134/113, 134/169 A, 134/172, 134/199
[51] Int. Cl............................................ B08b 3/02
[58] Field of Search............ 134/113, 166 R, 167 R, 134/168 R, 169 R, 169 A, 172, 199

[56] References Cited
UNITED STATES PATENTS

| | | | |
|---|---|---|---|
| 1,701,864 | 2/1929 | Reinhardt | 134/113 X |
| 2,826,209 | 3/1958 | Klein et al. | 134/199 X |
| 3,421,527 | 1/1969 | Dettman | 134/199 X |
| 3,620,234 | 11/1971 | Everroad | 134/113 X |
| 3,665,547 | 5/1972 | Boylan | 134/113 X |

*Primary Examiner*—Robert L. Bleutge
*Attorney, Agent, or Firm*—Oltman and Flynn

[57] ABSTRACT

A cartridge cleaner for cleaning filter cartridges which includes a shell having an inner wall defining a bore for receiving a filter cartridge, an annular space in the shell around the inner wall, and an inlet for introducing water or other cleaning liquid into the annular space and then the bore for cleaning a filter cartridge in the bore. The inner wall has apertures in it through which the cleaning liquid can pass from the annular space into the bore.

2 Claims, 5 Drawing Figures

PATENTED JUN 28 1974 3,820,552
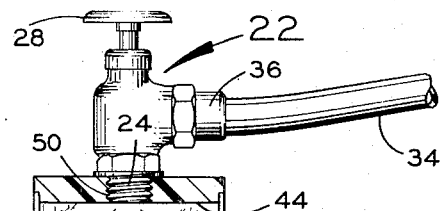
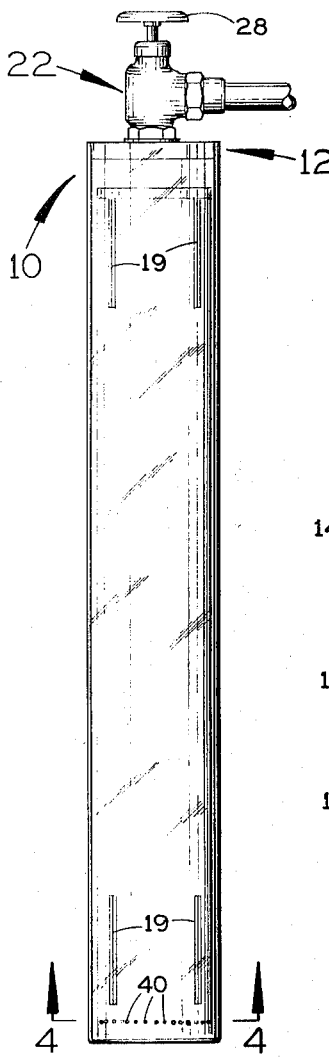
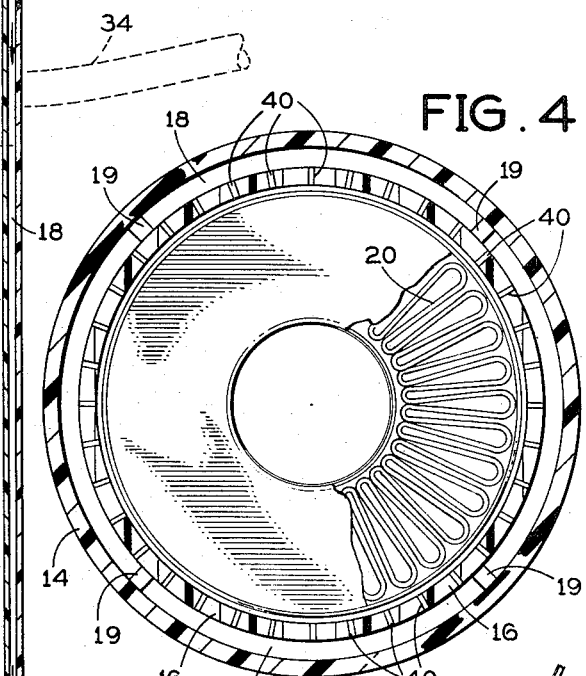
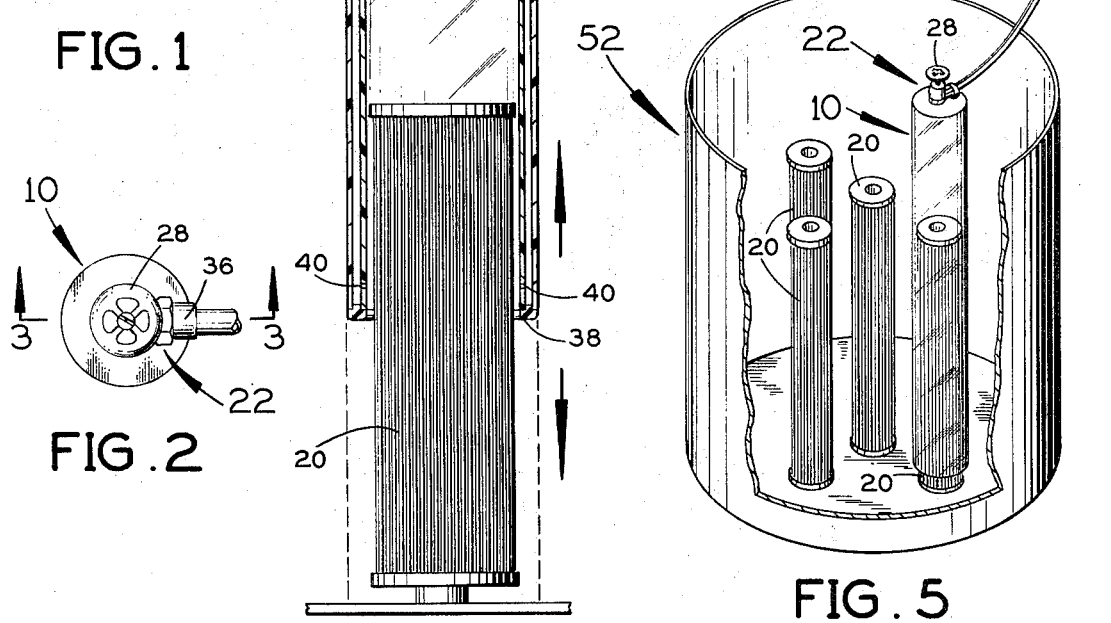
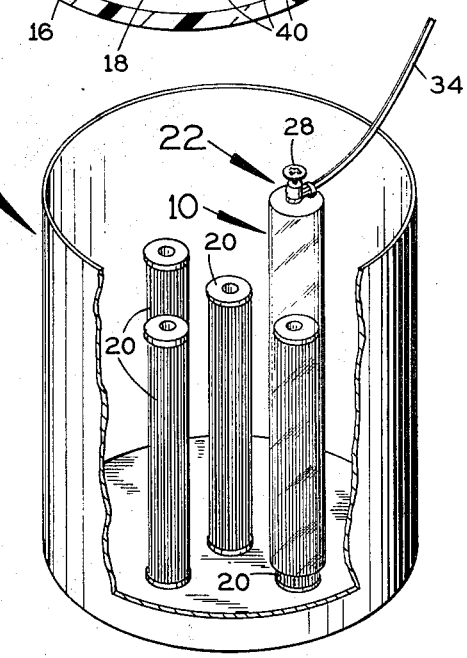

3,820,552

FILTER CARTRIDGE CLEANER

BACKGROUND OF THE INVENTION

At the present time, filter cartridges are used in various types of commercial filters including filters for swimming pools. It is difficult to clean such filter cartridges. For example, the user may have to spray water from a hose on the filter cartridge, and both water and dirt splash nearby objects including the person doing the spraying. It is difficult to tell when the filter cartridge is clean using this approach as well as other cleaning methods.

SUMMARY OF THE INVENTION

The present invention provides a filter cartridge cleaner in which liquid is introduced into an annular space outside a tube or inner shell in which the filter cartridge is received, and the water then flows through apertures into a bore inside the tube. The cleaner may optionally have a transparent wall or walls through which the liquid in the cleaner may be viewed for observing the progress of the cleaning and determining when the cartridge is sufficiently clean.

Accordingly, it is an object of the present invention to provide an improved cartridge cleaner for cleaning filter cartridges.

Another object of the invention is to avoid spraying or splashing of cleansing liquid during the cleaning of a filter cartridge.

Another object of the invention is to make the cleaning liquid visible as it cleans the filter cartridge.

A further object of the invention is to facilitate manual manipulation of the cartridge cleaner.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 1 is an elevational view, partly cut away, of a filter cartridge cleaner in accordance with one embodiment of the invention;

FIG. 2 is a top plan view of the filter cartridge cleaner of FIG. 1;

FIG. 3 is a vertical sectional view taken along line 3—3 of FIG. 2 and looking in the direction of the arrows;

FIG. 4 is a cross sectional view taken along line 4—4 of FIG. 1 and looking in the direction of the arrows; and FIG. 5 is a schematic view of a filter apparatus illustrating how the cartridge cleaner may be used to clean a filter cartridge.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

The filter cartridge cleaner 10 includes a shell means 12 having an outer cylindrical shell 14 and an inner cylindrical shell 16 mounted concentrically. These shells may advantageously be made of transparent plastic, but other materials may be suitable for some applications. The inner shell 16 has an outside diameter substantially smaller than the inside diameter of the outer shell 14 to define an annular cylindrical space 18 between the shells. The inner shell 16 has an inside diameter only slightly greater than the outside diameter of a filter cartridge 20 to be cleaned so that the inner shell 16 will closely receive the filter cartridge 20. A wall 17 closes the top of inner shell 16. The height of the inner shell 16 is greater than the height of the filter cartridge 20 so that substantially the entire filter cartridge 20 can be received inside shell 16. Spacer ribs 19 keep the shells spaced.

An inlet means 22 is mounted at the top of the outer shell 14 and has an inlet passage 24 leading through the top of the outer shell 14 for supplying cleaning liquid such as water into the annular cylindrical space 18 inside shell 14. The inlet means 22 also includes a valve 28 for controlling the flow of liquid into the annular cylindrical space 18. A hose or conduit 34 is affixed to the inlet means 22 by a coupling 36, and the hose 34 is connected to a source of cleaning liquid such as water when the cleaner is in use.

A flange 38 affixed to inner shell 16 abuts against the lower end of outer shell 14 and closes the lower end of the annular space 18 except for apertures 40 through inner shell 16. At the upper end of the cleaner, a flange 44 is affixed to outer shell 14. The inlet means is screwed at 24 into threads 50 tapped in flange 44. The top of wall 17 is located a minimum of 1/2 inch below the bottom of flange 44 to allow adequate space for the entry of cleaning fluid through flange 44 and into the annular cylindrical space 18. The joints of the shell means 12 are sealed with cement.

OPERATION

FIG. 5 illustrates schematically a filter apparatus 52 which includes several of the filter cartridges 20. A filter apparatus of this type might be used in a swimming pool by way of example. Dirt is deposited on the surface and penetrates into the surface of the cartridge. The cartridges 20 become dirty after a considerable amount of liquid has been filtered through the cartridges.

In order to clean the cartridges, the cartridge cleaner 10 is placed down over a filter cartridge 20 as illustrated in FIG. 5 so that substantially the entire filter cartridge is received within the bore 26. The valve 28 is opened to supply water or other cleaning liquid through the inlet means 22 into the annular cylindrical space 18. This water is discharged through the aperatures 40 and against the outer surface of the filter cartridge 20 with a high velocity. As the cleaner 10 is moved up and down over the length of the cartridge 20, the cleaning liquid breaks up and flushes down the accumulated dirt. It is relatively easy to tell when this liquid begins to clear up since the shells are transparent, thus indicating that the filter cartridge is sufficiently clean. When the water in shell means 12 begins to appear clean, the cleaner apparatus 10 is removed from the cartridge and moved to another cartridge. It may be noted that water does not spray outside the cartridge cleaner.

Having thus described our invention, we claim:

1. In a cartridge cleaner for cleaning cylindrical filter cartridges comprising an outer shell and an inner cylindrical shell affixed to each other in concentric relation and forming an annular space between the same, said inner shell having an inner bore with a height greater than the height of a cylindrical filter cartridge to be cleaned, said inner shell having an outer diameter smaller than the inner diameter of said outer shell and an inner diameter only slightly greater than the outer diameter of said filter cartridge so that said inner shell may closely receive said filter cartridge inside the same, inlet means for introducing cleaning liquid into the annular space, said inner shell having a closed top and an open bottom, and said outer shell having a closed top and a closed bottom at said annular space, the improvement wherein said inner shell has a vertically narrow array of circumferentially spaced, laterally directed openings near the bottom for discharging the cleaning liquid from said annular space onto a vertically narrow circumferential segment of the cartridge, and both said outer and inner shells are transparent adjacent said openings to permit viewing of the cartridge and the cleaning liquid thereat.

2. A cleaner according to claim 1, wherein said inlet means comprises a manually operable valve mounted directly on the top of said outer shell, said valve having a laterally projecting inlet for attachment to the end of a hose and an outlet leading down through the top of the outer shell into the latter's interior for passing the cleaning liquid from the hose down into said annular space between the outer and inner shells.

* * * * *